United States Patent [19]

Lange

[11] Patent Number: 4,493,005

[45] Date of Patent: Jan. 8, 1985

[54] OVERLOAD BY-PASS CONDUCTOR WITH AN EXTERNAL SHORT CIRCUIT PATH

[75] Inventor: Gerhard Lange, Berlin, Fed. Rep. of Germany

[73] Assignee: Siemens Aktiengesellschaft, Berlin and Munich, Fed. Rep. of Germany

[21] Appl. No.: 444,089

[22] Filed: Nov. 24, 1982

[30] Foreign Application Priority Data

Nov. 25, 1981 [DE] Fed. Rep. of Germany ....... 3146787

[51] Int. Cl.[3] ............ H02H 9/06

[52] U.S. Cl. ............ 361/124; 361/119; 337/34

[58] Field of Search ............ 361/124, 118, 119, 54, 361/55, 57, 103, 104; 337/28, 31, 32, 33, 34, 15

[56] References Cited

U.S. PATENT DOCUMENTS 2,124,364 7/1938 Brach ............ 361/124

2,562,692 7/1951 Bigwood ............ 361/124 X

FOREIGN PATENT DOCUMENTS 765050 1/1957 United Kingdom ............ 361/124

*Primary Examiner*—Patrick R. Salce

*Attorney, Agent, or Firm*—Herbert L. Lerner; Laurence A. Greenberg

[57] ABSTRACT

Overload by-pass conductor with an external short circuit heat conduction path, including an outer wall of the overload by-pass conductor, two electrodes, one of the electrodes being a counter electrode, a contact surface connected to the counter electrode, a metal carrier being disposed along the outer wall and being electrically conductingly connected to one of the electrodes, and a solder piece being in a mechanically fixed connection with the metal carrier and being adjacent the contact surface, the solder piece being spaced from other parts of the overload by-pass conductor in an operating state, and the solder piece being deformable for causing an external short circuit upon the occurrence of an overload, the external short circuit being triggered after a delay with respect to the beginning of the overload due to the heat conduction path.

8 Claims, 3 Drawing Figures

OVERLOAD BY-PASS CONDUCTOR WITH AN EXTERNAL SHORT CIRCUIT PATH

Figure 1:
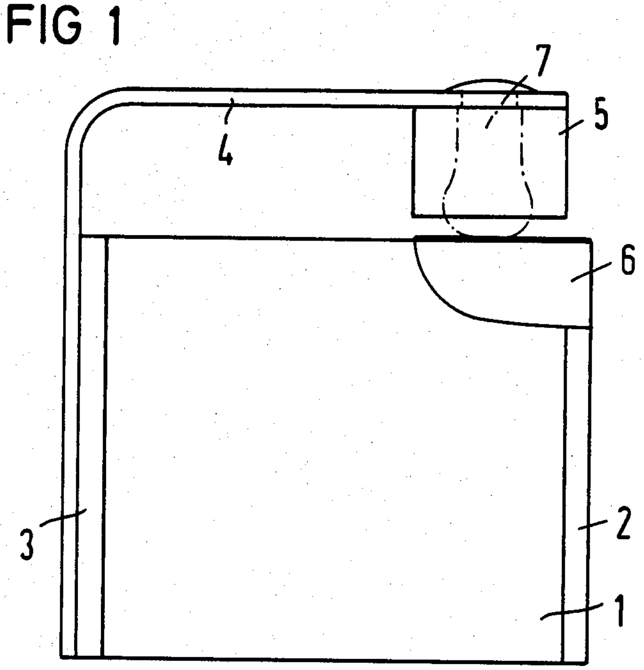

The invention relates to an overload by-pass conductor with an external short circuit path, wherein during an overload, an outer short circuit is provided by the deformation of a solder piece, the external short circuit being triggered with a delay with respect to the beginning of the overload due to the heat conduction path, and wherein the solder piece is fastened to a metal carrier, which extends along the outer wall of the overload by-pass conductor and is electrically conductingly connected to an electrode of the overload by-pass conductor.

An overload by-pass conductor of this type is known from U.S. application Ser. No. 108,369, filed Dec. 31, 1979 and now abandoned.

In U.S. Pat. No. 4,034,326, an overload by-pass conductor is shown, in which a solder piece in disposed on one of the electrodes, which holds an elastic spring-contact strip in position in vicinity of the point where it is fastened, and which in this manner holds the short circuit contact open until the solder melts because of an increase in its temperature. French Pat. No. 2,271,660 shows an overload by-pass conductor, that is provided with small solder pieces which are directly connected with the electrodes, and which melt when the electrodes are overheated, so as to bridge the discharge gap.

It is accordingly an object of the invention to provide an overload by-pass conductor with an external short circuit path, which overcomes the disadvantages of the heretofore-known devices of this general type, to permit a sufficiently delayed closing of the short circuit path even in relatively small overload by-pass conductors, and to permit switching of large short circuit currents at the same time.

In the present state of the art, in case of an overload, heating takes place in such a short time, especially in small versions of overload by-pass conductor devices, that the power capability or efficiency of the overload by-pass conductor is not fully utilized.

With the foregoing and other objects in view there is provided, in accordance with the invention, an overload by-pass conductor with an external short circuit heat conduction path, comprising an outer wall of the overload by-pass conductor, two electrodes, one of the electrodes being a counter electrode, a contact surface connected to the counter electrode, a metal carrier being disposed along the outer wall and being electrically conductingly connected to one of the electrodes, and a solder piece being in a mechanically fixed connection with the metal carrier and being adjacent the contact surface, the solder piece being spaced from other parts of the overload by-pass conductor in an operating state, and the solder piece being deformable for causing an external short circuit upon the occurence of an overload, the external short circuit being triggered after a delay with respect to the beginning of the overload due to the heat conduction path.

The embodiment described in U.S. application Ser. No. 108,369 requires that the small piece of solder be disposed on one hand at the carrier, and on the other hand at the housing of the overload by-pass conductor device. Thus, the solder piece is heated from both sides. The same condition also applies for U.S. Pat. No. 4,034,326. French Pat. No. 2,271,660 does show a production of the short circuit by melting solder, however its proposed solution provides practically no delay time between the overload and the melting of the solder.

In contrast to this existing state of the art, the invention has the advantage of assuring that the heat admission or convection to the solder piece is only effected through the carrier. This carrier can be constructed, with respect to its dimensions and by selecting material suitable for the specific application, in such a manner that it can also be used in overload by-pass conductor devices having very small dimensions.

In case the electrodes are made of metal stampings, it is advantageous if, in accordance with another feature of the invention, the metal carrier is integral with one of the electrodes. The metal carrier can be simultaneously stamped and formed with the electrode.

If the carrier is made of plain metal, the carrier is disposed above the body of the overload by-pass conductor when in use, so that the deforming solder is pulled by gravitational force onto the contact surface. The installation of the overload by-pass conductor in any chosen orientation is made possible if, in accordance with a further feature of the invention the metal carrier is formed of a bimetal. In this case, the heat conduction through the carrier is utilized in two ways. The bi-metallic strip provides the connection to the contact area, and the solder holds the short circuit after its cooling. The cohesion of the solder is sufficient to allow the bi-metallic strip to again move away from the overload by-pass conductor as it gets colder, without causing an interruption of the electrical connection.

In particular, for very small versions and desired short delay times, it is advantageous if, in accordance with an added feature of the invention, the metal carrier is formed of a solder alloy and is integral with the small solder piece. In this case, the small solder piece has a larger cross section than the carrier, in order to absorb the heat when the short circuit is closed, without melting the small solder piece completely. In this case, the deformation causing the short circuit only takes the form of a bending of the carrier.

In accordance with an additional feature of the invention, the contact surface is an edge of the counter electrode. However, if required, a contact bracket can also be connected with the edge of the counter electrode, so that in case of a short circuit, contacting occurs in a location spatially removed from the overload by-pass conductor. In accordance with a concomitant feature of the invention, the contact surface is in the form of a contact strip being integral with the counter electrode.

Other features which are considered as characteristic for the invention are set forth in the appended claims.

Although the invention is illustrated and described herein as embodied in an overload by-pass conductor with an external short circuit path, it is nevertheless not intended to be limited to the details shown, since various modifications and structural changes may be made therein without departing from the spirit of the invention and within the scope and range of equivalents of the claims.

Figure 2:
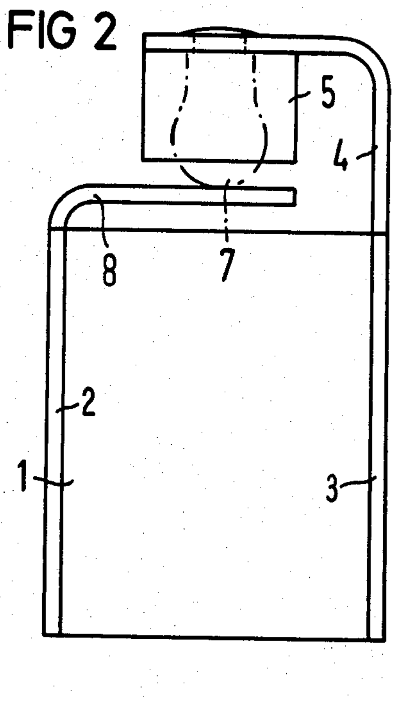
Figure 3:
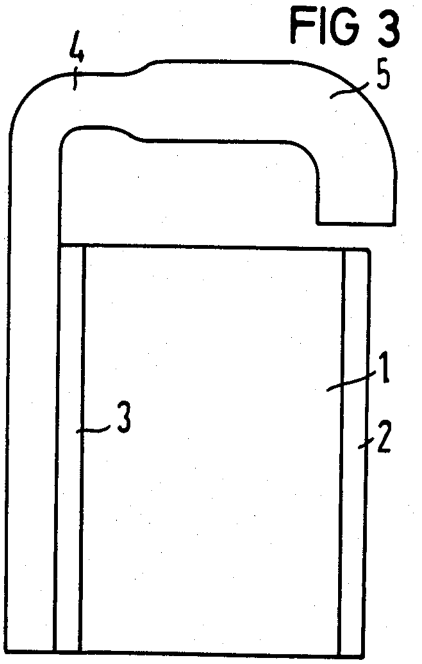

The construction and method of operation of the invention, however, together with additional objects and advantages thereof will be best understood from the following description of specific embodiments when read in connection with the accompanying drawings, in which:

FIGS. 1–3 are diagrammatic elevational views of three different embodiments of contact devices according to the invention.

Referring now to the figures of the drawing and first particularly to FIG. 1 thereof, it is seen that an overload by-pass conductor 1 is provided with electrodes 2 and 3 which lie opposite each other. According to FIG. 1, the electrode 3 is fixedly connected to a metallic carrier 4. The connection is mechanical as well as electrically conducting. A small soft solder piece 5 is attached to the metallic carrier 4. A contact surface 6 lies opposite the soft solder piece 5. The contact surface 6 is electrically conductingly connected to the electrode 2 which is a counter electrode. If an excessive voltage is applied to the overload by-pass conductor, the solder piece 5 becomes softer, and takes the shape of a deformed solder piece 7. This deformed solder piece 7 forms a short circuit with the contact surface 6. It is advantageous to construct the metallic carrier 4 as a bi-metallic strip. In this case, the overload by-pass conductor can be mounted in any position. The contact is made by bending the bi-metal strip. After the strip cools, the short circuit is maintained by the solder piece. If the bi-metal strip springs back as it is cooling before the solder piece 5 becomes solid, a deformed solder piece is again formed, and due to the cohesion of the metal, the contact is not interrupted.

According to FIG. 2, a carrier 4 is connected as a one-piece part with the electrode 3. A contact strip 8 is connected as a one-piece part with the counter electrode 2. The solder piece 5 lies opposite the contact strip 8, and forms the short circuit with the contact strip 8 in the case of an overload.

According to FIG. 3, a carrier 4 made of solder alloy or metal is fastened on a contact surface 3. The carrier 4 is integral with or blends into the solder contact piece 5. The solder contact piece 5 lies directly opposite the counter electrode 2. In the case of an overload, the carrier 4 bends at its curved portion before a melting can take place. The solder piece 5 forms the short circuit, and is accordingly heated in the contact region, so that it melts locally, and a solder connection with the electrode 2 is created. This embodiment is especially well suited for a relatively quick disconnection, since a relatively large current flow is possible, and the deformation takes place in vicinity of the electrode. The cross section of the contact piece 5 is chosen in such a way that the occuring short circuit currents cannot cause a complete melting of the contact piece. In many cases, it is practical to use a soft solder for the solder. However, with a suitable construction of the overload by-pass conductor, solder types with higher melting points can also be used.

I claim:

1. Overload by-pass conductor with an external short circuit heat conduction path, comprising a metal carrier, a solder piece and other parts of the overload by-pass conductor, said other parts including an outer wall of the overload by-pass conductor, two electrodes disposed on said outer wall, one of said electrodes being a counter electrode, and a contact surface connected to said counter electrode, said metal carrier being disposed along said outer wall and being electrically conductingly connected to one of said electrodes, said solder piece being in a mechanically fixed connection with said metal carrier and being adjacent said contact surface, said solder piece being spaced from all of said other parts of the overload by-pass conductor in an operating state, and said solder piece being deformable for causing an external short circuit by directly contacting said contact surface upon the occurence of an overload, said external short circuit being triggered after a delay with respect to the beginning of the overload due to the heat conduction path.

2. Overload by-pass conductor according to claim 1, wherein said metal carrier is integral with one of said electrodes.

3. Overload by-pass conductor according to claim 1, wherein said metal carrier is formed of a bimetal.

4. Overload by-pass conductor according to claim 2, wherein said metal carrier is formed of a bimetal.

5. Overload by-pass conductor according to claim 1, wherein said metal carrier is formed of a solder alloy and is integral with said solder piece.

6. Overload by-pass conductor according to claim 2, wherein said metal carrier is formed of a solder alloy and is integral with said solder piece.

7. Overload by-pass conductor according to claim 1, wherein said contact surface is an edge of said counter electrode.

8. Overload by-pass conductor according to claim 1, wherein said contact surface is in the form of a contact strip being integral with said counter electrode.

* * * * *